United States Patent
Lin et al.

(10) Patent No.: US 6,822,268 B2
(45) Date of Patent: Nov. 23, 2004

(54) TWO LAYER MIRROR FOR LCD-ON-SILICON PRODUCTS AND METHOD OF FABRICATION THEREOF

(75) Inventors: Yung-Tao Lin, Singapore (SG); Sik On Kong, Singapore (SG)

(73) Assignee: Chartered Semiconductor Manufacturing Ltd., Singapore (SG)

( * ) Notice: Subject to any disclaimer, the term of this patent is extended or adjusted under 35 U.S.C. 154(b) by 0 days.

(21) Appl. No.: 10/437,332

(22) Filed: May 13, 2003

(65) Prior Publication Data

US 2003/0203526 A1 Oct. 30, 2003

Related U.S. Application Data

(62) Division of application No. 09/495,347, filed on Feb. 1, 2000, now Pat. No. 6,569,699.

(51) Int. Cl.[7] .................................... H01L 33/00
(52) U.S. Cl. .................. 257/98; 257/57; 257/59; 349/147
(58) Field of Search ........................................ 257/98

(56) References Cited

U.S. PATENT DOCUMENTS

| | | | | |
|---|---|---|---|---|
| 5,471,330 A | | 11/1995 | Sarma | .......................... 359/59 |
| 5,486,485 A | | 1/1996 | Kim et al. | ...................... 437/41 |
| 5,489,552 A | * | 2/1996 | Merchant et al. | ........... 438/629 |
| 5,580,823 A | * | 12/1996 | Hegde et al. | ................ 438/648 |
| 5,633,182 A | | 5/1997 | Miyawaki et al. | ............. 438/30 |
| 5,946,547 A | | 8/1999 | Kim et al. | ...................... 438/30 |
| 6,300,241 B1 | * | 10/2001 | Moore et al. | ................ 438/637 |
| 6,569,699 B1 | * | 5/2003 | Lin et al. | ....................... 438/30 |

* cited by examiner

*Primary Examiner*—Maria F. Guerrero
*Assistant Examiner*—Pamela E Perkins
(74) *Attorney, Agent, or Firm*—George O. Saile; Rosemary L.S. Pike; Stephen G. Stanton

(57) ABSTRACT

A method of fabricating an LCD-on-silicon pixel device, comprising the following steps. A substrate having an upper layer of silicon is provided. A via is formed in the silicon layer. An opaque conducting layer is deposited over the silicon layer, filling the via. The opaque conducting layer is planarized a reflective layer is deposited over the opaque conducting layer. Alternatively, the via may be formed by a deposition and etch back process with one metal. An opaque conducting layer is then deposited and planarized before deposition of the reflective layer. An LCD-on-silicon pixel device, comprises a substrate having an upper silicon layer. The upper silicon layer has a plug therein comprised of an opaque conducting material. Over the upper silicon layer and the opaque conducting plug is a planar opaque conducting layer and a planar reflective layer is over the planar opaque conducting layer.

14 Claims, 2 Drawing Sheets

US 6,822,268 B2

TWO LAYER MIRROR FOR LCD-ON-SILICON PRODUCTS AND METHOD OF FABRICATION THEREOF

This is a division of patent application Ser. No. 09/495,347, filing date Feb. 1, 2000, now U.S. Pat. No. 6,569,699 Two Layer Mirror For Lcd-On-Silicon Products And Method Of Fabrication Thereof, assigned to the same assignee as the present invention.

BACKGROUND OF THE INVENTION

The top metal layer of a LCD-on-silicon display pixel serves both as a mirror to reflect light and as an electrode to control the gray scale of the top LCD material. Aluminum (Al) is normally used because of its high reflectivity and its compatibility to integrated circuit production. If the aluminum layer is thick (>2000 Å), then the grain size is normally big which degrades reflectivity. If the aluminum layer is thin (<2000 Å), then light penetrates through the aluminum layer and affects the functioning of the transistor below by the photoelectric effect. Also, the via, which serves as the electrical connection to the top metal pixels, usually produces a dimple on the aluminum layer which also affects reflectivity.

U.S. Pat. No. 5,486,485 to Kim et al. describes a method of forming a plurality of SOI (silicon-on-insulator) transistors in a pattern beneath planarized reflective surfaces of a reflective display.

U.S. Pat. No. 5,946,547 to Kim et al. describes a method of fabricating LCD devices using three patterning steps. When reflective-type LCD devices are fabricated, a reflective layer comprised of Al, for example, may be formed on the rear surface of the substrate opposite the patterned conductive layer to prevent loss of light which penetrates through the pixel electrode.

U.S. Pat. No. 5,633,182 to Miyawaki et al. describes a method of manufacturing an image display device wherein the switching (driving) transistor and the interconnection layer are formed on one of the surfaces of the insulating layer (insulator) which is remote from the liquid crystal layer while the liquid crystal voltage applying electrode is formed on the other surface of the insulating layer close to the liquid crystal layer. Thus it is possible to provide a light-blocking layer near the transistor allowing the aperture ratio to be increased, reducing the cross-talk among the adjacent pixels, and increasing the S/N ratio.

U.S. Pat. No. 5,471,330 to Sarma describes a liquid crystal display pixel and a method of forming same, wherein each pixel has a thin film transistor with a silicon pixel electrode. A doping and recrystallization of the silicon is effected to increase the electrical conductivity and light transmittance of the silicon adequately for the pixel electrode. An ITO (indium tin oxide) layer is not required for the pixel electrode.

SUMMARY OF THE INVENTION

Accordingly, it is an object of the present invention to provide LCD-on-silicon pixels and a method of fabricating LCD-on-silicon pixels using a thin aluminum layer.

Another object of the present invention is to provide LCD-on-silicon pixels and a method of fabricating LCD-on-silicon pixels having a planar upper surface unaffected by any defects in the underlying via.

A further object of the present invention is to provide LCD-on-silicon pixels and a method of fabricating LCD-on-silicon pixels with increased reflectivity of the aluminum mirror by depositing a thin aluminum layer with small grain.

Yet another object of the present invention is to provide LCD-on-silicon pixels and a method of fabricating LCD-on-silicon pixels that prevent light penetrating the aluminum mirror layer and affecting the underlying transistor junctions by photoelectric effect.

Another object of the present invention is to provide LCD-on-silicon pixels and a method of fabricating LCD-on-silicon pixels that permit an increase in the permissible amount of light to fall on the pixels so as to have a larger and/or clearer overall picture/images.

Other objects will appear hereinafter.

It has now been discovered that the above and other objects of the present invention may be accomplished in the following manner. Specifically, a substrate having an upper layer of silicon is provided. A via is formed in the silicon layer. An opaque conducting layer is deposited over the silicon layer, filling the via. The opaque conducting layer is planarized and a reflective layer is deposited over the opaque conducting layer to form an LCD-on-silicon pixel device. Alternatively, the via may be formed by a deposition and etch back process with one metal. An opaque conducting layer is then deposited and planarized before deposition of the reflective layer. An LCD-on-silicon pixel device, comprises a substrate having an upper silicon layer. The upper silicon layer has a plug therein comprised of an opaque conducting material. Over the upper silicon layer and the opaque conducting plug is a planar opaque conducting layer and a planar reflective layer is over the planar opaque conducting layer.

BRIEF DESCRIPTION OF THE DRAWINGS

The features and advantages of the two layer mirrors for LCD-on-silicon devices, and the method of fabricating same, according to the present invention will be more clearly understood from the following description taken in conjunction with the accompanying drawings in which like reference numerals designate similar or corresponding elements, regions and portions and in which.

DETAILED DESCRIPTION OF THE PREFERRED EMBODIMENT

Unless otherwise specified, all structures, layers, etc. may be formed or accomplished by conventional methods known in the prior art.

Process Known to the Inventors

Figure 1:
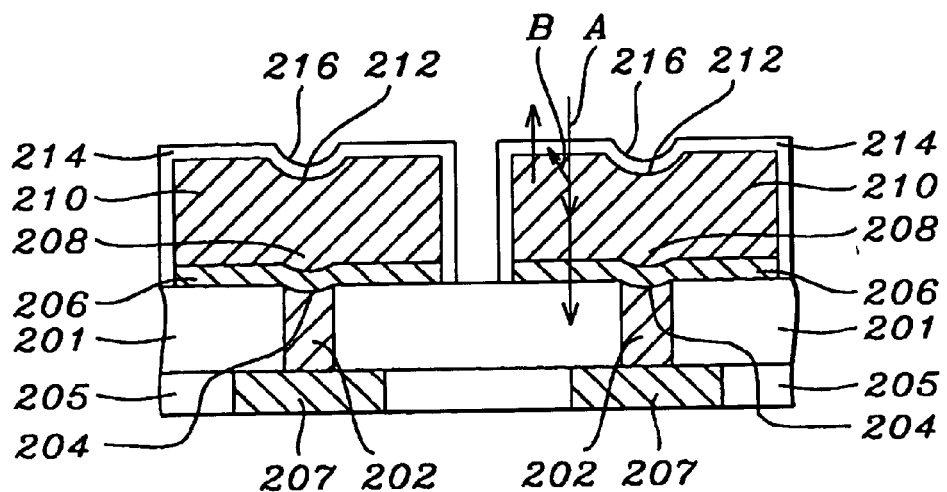
FIG. 1 schematically illustrates in cross-sectional representation a method of forming an LCD-on-silicon mirror element known to the inventors.

FIG. 1 illustrates a method of forming an LCD-on-silicon mirror element known to the inventors. Vias 202 are formed within an upper layer of silicon oxide ($SiO_2$) on substrate 200. Vias 202 have depressions or dimples 204 in their upper surface resulting from the formation of vias 202.

Dimples 204 are transferred to overlying barrier metal layers 206 formed over substrate 200 and vias 202 as barrier layer dimples 208.

Aluminum layers 210 formed over barrier layers 206 similarly have barrier layer dimples 208 transferred as aluminum layer dimples 212.

Optical interface layers 214 formed over the exposed sides and upper surfaces of aluminum layers again similarly have aluminum layer dimples 212 transferred as optical interface layer dimples 216.

It is desired that all light rays reflect off the upper surface of the LCD-on-silicon mirror elements. However, in this LCD-on-silicon mirror element design, if aluminum layers 210 are thin, i.e. less than about 2000 Å, then light rays designated "A" penetrate aluminum layers 210. Further, if aluminum layers 210 are thick, i.e. greater than about 2000 Å, then light rays designated "B" scatter because of the larger aluminum grain size. Additionally, aluminum layer dimples 212 affect reflectivity due to their concave structure.

PREFERRED EMBODIMENT OF THE PRESENT INVENTION

Accordingly as shown in FIGS. 2–5, fabrication of a pair of LCD-on-silicon two layer mirror pixels are illustrated. Of course only one such pixel, or more than two pixels may be fabricated in according with the present invention.

Figure 2:
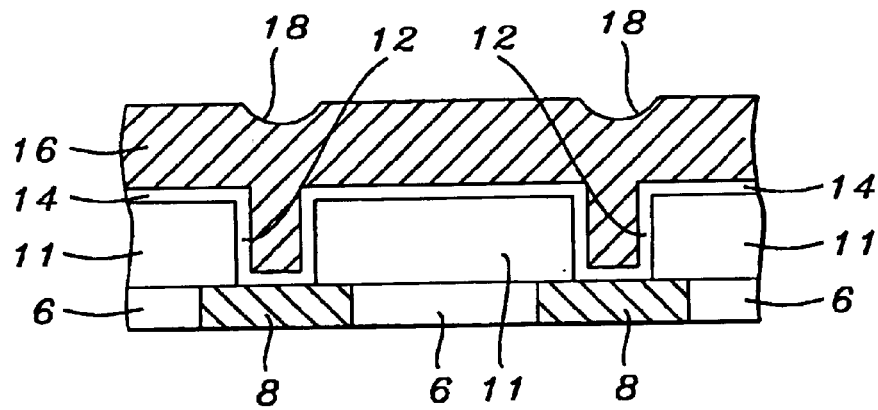
FIGS. 2 through 6 schematically illustrate in cross-sectional representation a preferred embodiment of the present invention.

FIG. 2 shows a cross sectional view of an inter-metal dielectric layer 6 and interconnects 8. The inter metal dielectric layer 6 and interconnects overlie a substrate having devices (such as field effect transistor (FETS) and conductive lines interconnecting the devices).

As shown in FIG. 2, an intermetal dielectric (IMD) layer 11 is etched to form via openings 12.

Barrier layer 14 is formed over the surface of the inter metal dielectric (IMD) layer 11 and covers the sidewalls of the via openings 12. Barrier layer 14 is preferably a metal layer comprised of titanium/titanium nitride (Ti/TiN) and may also be comprised of cobalt nitride. Metal barrier layer has a thickness of from about 200 to 2000 Å, and more preferably from about 600 to 1000 Å.

Opaque conducting layer (e.g., intermediate conductive layer) 16 is then formed over substrate 10, filling barrier metal lined vias 12. Conducting layer 16 is an intermediate conductive layer that is hard enough to be processed by chemical mechanical polishing (CMP), or other planarizing processes, and is also dense enough to stop light from penetrating therethrough. Opaque conducting layer 16 is deposited from about 5000 to 30,000 Å above the surface of the IMD layer 11, and more preferably from about 8000 to 15,000 Å above the surface of the IMD layer 11.

Conducting layer 16 may be comprised of tungsten (W), titanium (Ti), titanium nitride (TiN), chromium (Cr), silver (Ag), cobalt, or cobalt nitride and is preferably tungsten. Conducting layer 16 is not comprised of Al.

Figure 6:
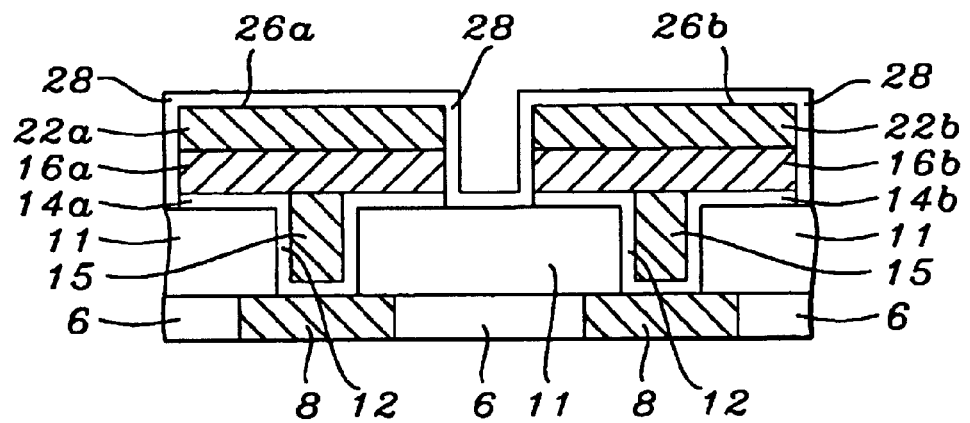

Opaque conducting layer 16 may be a single material deposited in one step, as shown in FIG. 2. Alternately, as shown in FIG. 6, the opaque conducting layer be comprised of a lower plug 15 and a upper opaque conducting layer 16a 16B. The lower plug 15 and the opaque conducting layer can be formed of the same material or two different materials. A first layer fills barrier lined vias 12 to form the plugs 15. Then we deposit in a second layer to blanket cover intermetal dielectric layer and the plug to the above noted thickness over inter metal dielectric layer 11.

In either event, intermediate conducting layer 16 includes dimples 18 that are transferred from dimples (not shown) formed over vias 12 by the process of filling vias 12.

Figure 3:
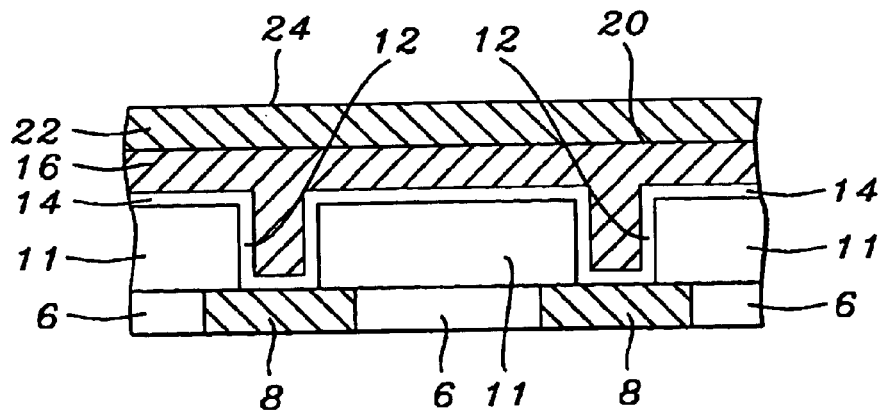

As shown in FIG. 3, in an important step in the present invention, conducting layer 16 is polished back and planarized, preferably by chemical mechanical polishing, to remove dimples 18 and to form an optically flat upper surface 20 preferably to a thickness of from about 500 to 2000 Å.

A thin reflective layer 22 is then deposited over optically flat upper surface 20 of conducting layer 16 to a thickness of from about 300 to 2000 Å, and more preferably from about 1000 to 2000 Å. Reflective layer 22 may be comprised of aluminum (Al), an aluminum copper alloy (AlCu), or aluminum silicon copper alloy (AlSiCu) and is preferably Al.

If is noted that the upper surface 24 of reflective layer 22 maintains the optical flatness of upper surface 20 of conducting layer 16.

Figure 4:
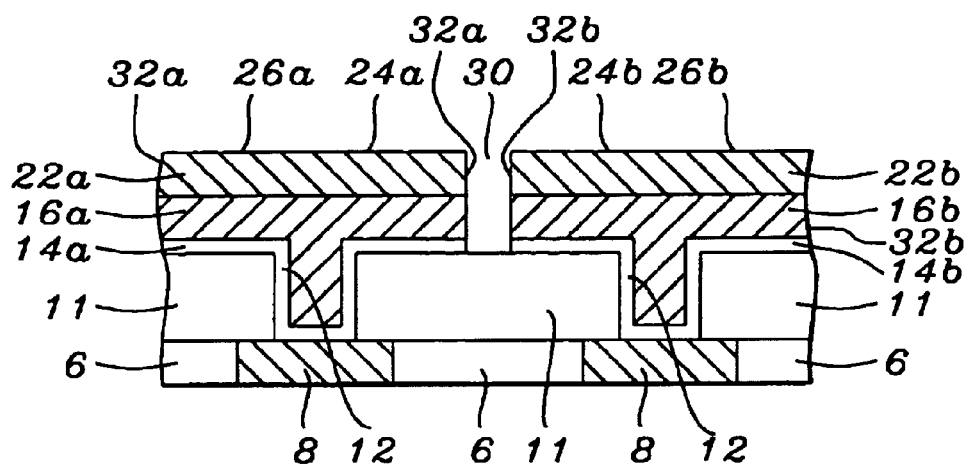

As shown in FIG. 4, the device is patterned to define the top metal layer, i.e. reflective layer 22 and conducting layer 16, as separate mirror pixels 26a, 26b with like portions 14a, 14b; 16a, 16b; 20a, 20b; 22a, 22b; 24a, 24b; respectively. For example, a photoresist layer (not shown) may be deposited and patterned with the subsequent etching of the device at 30. The photoresist layer is then stripped and removed.

Figure 5:
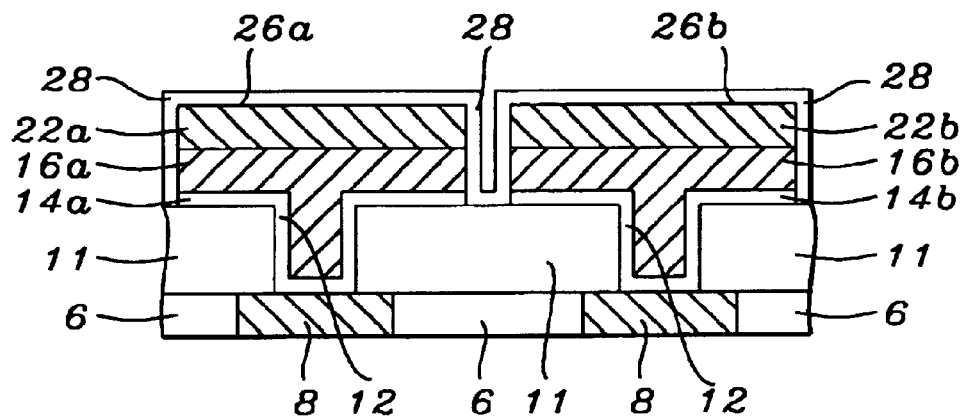

As shown in FIG. 5, optical interface layers 28 may then be deposited to enhance the reflected light and to passivate the exposed mirror surfaces 24a, 24b; 32a, 32b. Optical interface layers 28 may be comprised of ON (i.e., an oxide layer over a nitride layer), ONON, ONONON, etc., up to five (5) ON pairs, or other multiple transparent coatings that enhance light reflection. This completes formation of the two layer mirror LCD-on-silicon products of the present invention.

While particular embodiments of the present invention have been illustrated and described, it is not intended to limit the invention, except as defined by the following claims.

We claim:

1. An LCD-on-silicon pixel device, comprising:
   a substrate having an intermetal dielectric layer;
   a plug within said intermetal dielectric layer; said plug comprised of an opaque conducting material;
   a planar upper opaque conducting layer over said intermetal dielectric layer and said opaque conducting plug; and
   a planar reflective layer over said planar opaque conducting layer;
   wherein said opaque conducting plug and said planar upper opaque conducting layer comprise a unitary structure.

2. The device of claim 1, wherein said opaque conducting plug and said planar upper opaque conducting layer are each comprised of tungsten, titanium, titanium nitride, chromium, silver, cobalt, or cobalt nitride.

3. The device of claim 1, wherein said reflective layer is aluminum, an aluminum copper alloy, or an aluminum silicon copper alloy.

4. The device of claim 1, wherein said planar upper opaque conducting layer is from about 500 to 5000 Å thick.

5. The device of claim 1, wherein said planar upper opaque conducting layer is from about 500 to 2000 Å thick.

6. The device of claim 1, wherein said planar upper opaque conducting layer is planarized by chemical mechanical polishing.

7. The device of claim 1, wherein said reflective layer is from about 300 to 2000 Å thick.

8. The device of claim 1, wherein said reflective layer is from about 1000 to 2000 Å thick.

9. The device of claim 1, wherein said reflective layer is comprised of aluminum and is from about 300 to 2000 Å thick.

10. The device of claim 1, wherein said reflective layer is comprised of aluminum and is from about 1000 to 2000 Å thick.

11. The device of claim 1, including a barrier layer over said intermetal dielectric layer and lining said via.

12. The device of claim 1, including optical interface layers over said reflective layer.

13. The device of claim 1, including optical interface layers over said reflective layer; said optical interface layers being ON or multiple layers of ON.

14. The device of claim 1, wherein said planar reflective layer is on said planar opaque conducting layer.

* * * * *